Dec. 16, 1952  N. LANGER  2,621,704
HEAT SEALING DEVICE
Filed Feb. 11, 1950
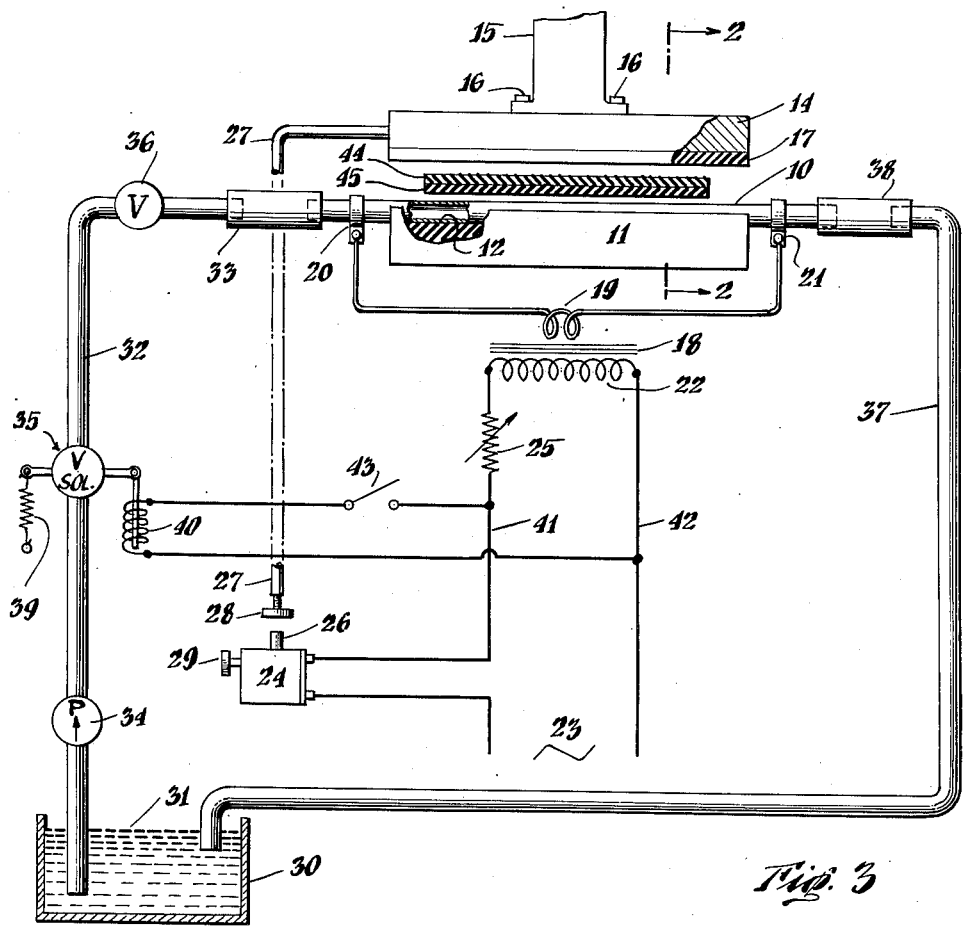
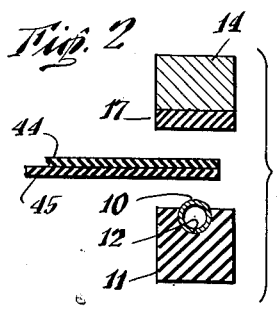
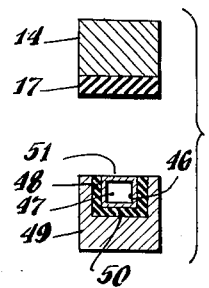
INVENTOR.
Nicholas Langer

UNITED STATES PATENT OFFICE 2,621,704

HEAT SEALING DEVICE

Nicholas Langer, New York, N. Y.

Application February 11, 1950, Serial No. 143,663

13 Claims. (Cl. 154—42)

This invention relates to the art of heat sealing thermoplastic films, and, more particularly, to a novel and improved sealing method and sealing elements or bar for heat sealing machines of the thermal impulse type.

As disclosed in my U. S. Patent No. 2,460,460, heat sealing machines of the thermal impulse type essentially comprise a pair of pressure members or bars and a reciprocating mechanism therefore whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinylidene chloride). A heater element in the form of a thin and narrow strip of a metal of high specific resistance, such as a suitable nickel-chromium alloy, is mounted on the face of at least one of said bars, constituting the operating or sealing surface of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low heat capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of current is dissipated and the seal produced is cooled and consolidated under pressure whereby a strong and sound seal is produced.

Heat sealing machines of the thermal impulse type provide important advantages over the conventional heat sealing machines in which the sealing member is maintained at a constant sealing temperature. Due to the fact that the thermal impulse principle permits the sealed region to cool and to consolidate under pressure, the quality of the seal is greatly improved. Also, the thermal impulse principle makes it possible to readily seal films or materials which cannot be sealed on an industrial scale with sealing members maintained at constant sealing temperatures, such as particularly Polythene and Saran.

Although the heat sealing machines of the thermal impulse type provided excellent results, certain practical difficulties were experienced, particularly when applying the principle to high-speed packaging machinery where it may be desirable to provide as many as 2 or more complete sealing cycles per second. It was found that at such accentuated speeds the short period of rest between successive sealing cycles was insufficient to completely dissipate the residual heat in the heater element and in the sealed region. As a result, heat would gradually build up in the heater or sealing element and in its supporting structure and would cause sticking of the sealed sheets to the bar or would otherwise interfere with the production of satisfactory seals. This difficulty was to a substantial extent alleviated by mounting the heater element or strip of low heat capacity upon, but insulatedly from, a supporting metal bar of high heat capacity arranged in intimate heat exchange relation with the heater element, and by providing in some cases positive cooling means for the said bar, as this is disclosed in my co-pending application Serial No. 598,777, filed June 11, 1945, now Patent No. 2,509,439, issued May 30, 1950. However, the difficulty still existed when sealing thermoplastic sheets or films of heavy gauge or when extremely high speeds of operation were desired, as is the case in certain automatic bag making and packaging machines. I have discovered that the problem may be solved in a simple and fully satisfactory manner.

It is an object of the present invention to provide a heat sealing element or device of the thermal impulse type which eliminates the difficulties and inconveniences experienced with prior heat sealing machines of the described general type.

It is another object of the present invention to provide a novel heat sealing element, particularly suitable for heat sealing machines of the thermal impulse type, the temperature of which may fluctuate between sealing temperature and cooling temperature with extreme rapidity.

It is a further object of the present invention to provide a novel and improved heat sealing element or device for heat sealing machines of the thermal impulse type in which the heater element and the cooling means therefor are combined in a single structural member of extreme simplicity thereby realizing a heretofore unobtainable intimate heat exchange relation between the two.

It is also within the contemplation of the invention to provide an improved heat sealing method of the thermal impulse type.

The invention also contemplates a novel and improved heat sealing machine of the thermal impulse type which is simple in construction, fully satisfactory in operation, and which may be readily manufactured and used on a practical and commercial scale at a low cost.

Other and further objects and advantages of the invention will become apparent from the following description, taken in conjunction with the accompanying drawing; in which Fig. 1 is a side elevational view, somewhat diagrammatic and fragmentary in character and having parts in section, of a heat sealing machine embodying the principles of the present invention;

Fig. 2 is a section taken on line 2—2 of Fig. 1; and

Fig. 3 is a section similar to Fig. 2, showing a modified embodiment of the invention.

Broadly stated, according to the principles of the present invention, I provide a heater element in the form of a tube or tubular member of electrically conducting material, such as a metal of high specific resistivity. Examples of suitable metals are Nichrome (a nickel base alloy containing 11–22% chromium and smaller amounts of silicon and manganese), Inconel (a nickel base heat- and oxidation-resistant alloy with approximately 12% chromium, 6% iron, small amounts of manganese, silicon and copper), and Monel (a non-ferrous alloy containing 60–70% nickel, 25–35% copper, with minor amounts of iron, manganese, silicon and carbon). A length of such member or tube is interposed in an electrical circuit suitable for passing short but high-intensity impulses of an electric current therethrough, thereby to heat it practically instantaneously to heat sealing temperatures so that a layer or layers of thermoplastic film in contact with the outer surface of the member or tube may be heat sealed, as this is more fully set forth in my aforesaid Patent No. 2,460,460.

In order to remove the residual heat remaining in the tube or in the sealed films after the sealing cycle, I pass a flow of coolant fluid through the inner space of the tube. Suitable coolant fluids contemplated by the invention are air or other gases, water, glycerin, ethylene glycol, and the like. In general, liquids, such as water, or water in admixture with some of the glycols are preferred. I have found that due to the very intimate heat exchange thus provided between the heater member or tube and the coolant fluid flowing therethrough, the temperature of the said tube will drop from the sealing temperature to that of the coolant fluid with great rapidity so that the tube is ready for the next sealing cycle almost as soon as the preceding cycle has been completed. This removes all practical limitations as to permissible sealing speeds so that extremely high operating speeds are obtainable.

While, due to its extreme simplicity of structure, it is preferred to form the tubular heater element of the invention of metal in its entirety, it is also possible to combine a layer or strip of thin metal with a channel-shaped insulating member so that the metal strip together with the insulating member constitutes a tubular member. In this case the outer surface of the metal layer or strip, heated by the passage of current in the layer, constitutes the heater element brought into contact with the material to be sealed, whereas the inner surface of the said metal layer or strip is in heat exchange relation with the coolant fluid passed through the inner space of the composite tubular member.

Referring now more particularly to Figs. 1 and 2 of the drawing, reference numeral 10 denotes an elongated, thin-walled tube of small diameter formed of metal, preferably of metal of high specific resistivity. This tube is mounted on a supporting member or bar 11 having a longitudinal groove 12 therein with a cross section generally conforming to that of the tube but cut off at the top so that it exposes the upper portion of the tube, which constitutes the operative or sealing face of the unit. Advantageously, the dimensions of tube 10 and of groove 12 are so determined that the tube is firmly held in the groove against accidental displacement, particularly against transverse or upward displacement, while at the same time being free for slight relative displacement in the axial direction under the effect of heat expansion. It is preferred to form the base or bar 11 of heat-resisting insulating material, such as asbestos-filled plastics, compressed mica, ceramics, and the like, although the base may be formed of metal, provided that a thin layer of insulation is interposed between the tube and the inner surface of the groove in the bar.

The heat sealing member constituted by tube 10 and its base 11 is arranged for cooperation with a pressure member or bar 14 which may be formed of aluminum, brass, steel or some other suitable metal. Pressure bar 14 is adapted to be displaced towards and pressed against the exposed operative surface of heater tube 10 by means of a suitable operating or reciprocating mechanism, which is diagrammatically indicated by a reciprocable support 15, secured to the pressure bar 14 by means of bolts 16. Preferably, the lower or operative surface of pressure bar 14 is covered with a layer 17 of elastic material capable of resisting the effect of heat sealing temperatures without appreciable deterioration. Suitable materials for this purpose are silicone rubber or Teflon (tetrafluorethylene). A covering of Teflon has the additional advantage that, due to its special surface characteristics, it prevents sticking of the sealed thermoplastic film to the pressure bar after the sealing operation.

Sealing pulses of an electric current may be supplied to heater tube 10 from a step-down transformer 18. The secondary or low voltage winding 19 of the said transformer is directly connected to the terminal regions of the tube 10 by means of terminal members 20 and 21. In the drawing, these terminal members are shown in the form of metal straps clamped around the tube and fixed by means of a bolt and nut combination. Obviously, the same results can be obtained by means of a great variety of other expedients or clamping members and in the simplest case electrical connection to the tube may be made by soldering or welding a lead wire directly to the outer surface of the tube. Primary winding 22 of the transformer has one of its terminals directly connected to one terminal of a source of alternating current 23, while the other terminal of the said primary winding is connected to the other terminal of source through a switching mechanism generally denoted by reference numeral 24 and an adjustable resistance 25. The switching mechanism includes an actuating plunger 26, operable by an L-shaped actuating rod 27 having its horizontal end secured in pressure bar 14 and its vertical end arranged in cooperating relation with respect to the said plunger so that the plunger will be displaced and operation of the switching mechanism is initiated during the downward stroke of the reciprocating mechanism. A set screw 28 in the lower end of actuating rod permits to adjust the effective length of the said rod and thereby determines the exact time when the switching mechanism is actuated. Preferably, the switching mechanism is combined with a time delay device whereby the switching mechanism is automatically disabled a predetermined period after initiation of the sealing current pulse. The length of the time delay period is adjustable by means of a set-screw 29.

The switching mechanism and its combination with a time delay device may take a great variety of different forms, a full description of which is omitted for the sake of simplicity as they do not form part of the present invention. For further details of suitable switching and time delay devices reference may be had to my Patents 2,460,460 and 2,479,375. In automatic heat sealing machines wherein a constant speed motor is employed for providing driving power, the switching mechanism may take the form of a simple switch operated by means of an adjustable cam, driven by the said motor either directly, or by means of a suitable reducing gear.

The cooling means for the sealing device of the invention comprise a reservoir or tank 30 having a body of coolant fluid 31 therein. The said reservoir is connected to the intake end of tube 10 through an intake conduit 32 connected to the said end of the tube by means of a coupling 33. A pump 34, an electromagnetically actuable solenoid valve 35 and an adjustable valve 36 are interposed in the intake conduit. An outlet conduit 37 is connected at one of its ends to the output end of tube 10 by means of another coupling member 38, while its other end is extended into reservoir 30. Thus, it will be noted that when pump 34 is operated and valves 35 and 36 are open, a circulatory flow of coolant fluid is maintained through heater tube 10.

It is desirable to form at least one, preferably both, of coupling members 33 and 38 of a suitable elastomer, such as natural or synthetic rubber. The interposition of couplings or conduits formed of an electrical insulating material into the flow of coolant fluid has the object of electrically insulating the electrical circuit of heater tube 10 from the metal conduits completing the coolant fluid circuit. Of course, the same result can be obtained by forming all of the conduits of elastic insulating material. In all cases, a very small portion of the current applied to the heater tube may be by-passed into the coolant fluid circuit through the fluid body itself. However, as the coolant fluids used are of a very low electrical conductivity, as compared to that of the heater tube, this current will be negligible, particularly as the voltage of the heater current pulse applied to the heater tube is quite low, generally in the order of a few volts. Forming at least a portion of the coolant fluid conduits, particularly in the outlet portion thereof, of a readily yielding elastomer has the additional advantage that such conduits will be also effective in taking up sudden surges in internal pressure occasioned by the rapid heating and expansion of the coolant fluid during the heating or sealing period.

Solenoid valve 35 is normally maintained open by means of a spring 39 and is adapted to be closed upon its solenoid 40 being energized. The ends of solenoid 40 are electrically connected across leads 41 and 42 supplying alternating current to transformer 18 from source 23 through switching mechanism 24. A switch 43 is interposed in the solenoid circuit and permits to render it operative or to disable it at will. It will be noted that the solenoid valve will be actuated during and for the same time as the transformer 18 is energized, provided that the switch 43 is closed. While the solenoid valve is in some cases a desirable addition and provides further improvement in operation, it is not absolutely necessary for carrying the invention into practice.

From the foregoing description, the operation of the heat sealing element and machine of the invention will be readily understood by those skilled in the art. Assuming first for the sake of simplicity that solenoid valve 35 is disabled by opening the solenoid circuit at switch 43, pump 34 maintains a circulatory flow of coolant fluid through heater tube 10 through the normally open valve 35 and adjustable valve 36. This flow, in the absence of sealing current pulses, will maintain heater tube 10 at a constant low temperature closely approximating that of the coolant fluid, for example water.

When it is desired to operate the machine for the production of seals, a pair of layers 44 and 45 of a thermoplastic film are placed between the sealing bar or base 11 having heater tube 10 thereon and the pressure bar 14 and the said bars are displaced into their pressure applying position. Depending upon the adjustment of set screw 28 in the lower end of actuating rod 27, sometime during this displacement, operation of switching mechanism 24 will be initiated and primary winding 22 of transformer 18 will be energized from alternating current source 23 through rheostat 25. As a result, a current of lower voltage but correspondingly higher intensity will be induced in secondary winding 19, which will energize heater tube 10, causing the practically instantaneous generation of sealing heat therein. This heat will be transferred by surface contact to the contacting region of the layers of thermoplastic film 44 and 45, causing heat sealing of the layers in the said region.

It will be readily appreciated that during the sealing period just described, the effective temperature of the heater tube is determined by two independent factors. The first one of these is the heating effect of the current flowing in the wall of the tube 10 and the other is the cooling effect of the coolant fluid continuously flowing through the inner space of the said tube. To produce a satisfactory seal, it is necessary to so adjust the heating effect of the sealing impulse of current (for example by rheostat 25) with respect to the cooling effect of the continuous coolant fluid flow (for example by opening or closing valve 36 to a greater or lesser degree) that the heating effect of the current greatly exceeds the cooling effect of the coolant.

A predetermined period after initiation of the pulse of sealing current, the time delay device forming part of switching mechanism 24 becomes effective, automatically disabling the switching means and disconnecting the heater tube 10 from the source of current. Preferably, pressure is maintained upon the sealed region of the thermoplastic layers for a short period thereafter, permitting the said region to cool and to consolidate under pressure, as this is set forth more fully in my aforesaid Patent No. 2,460,460. Thereupon the bars are separated and the heatsealed layers 44 and 45 are removed from the machine.

Immediately after completion of the sealing period, the temperature of the heater tube 10 is under the sole control of the coolant fluid circulation. I have found that the cooling effect of the coolant fluid flowing through the tube is so powerful that the temperature of the tube will drop from the heatsealing temperature to that of the coolant fluid with extreme rapidity. This makes it possible to start the next sealing cycle within a very short time after completion of the preceding one, thus permitting to increase the number of seals obtainable per unit of time very considerably and to any degree that may be practically desirable. In most cases, the number of satisfactory seals that can be produced per unit of time is limited only by the ability of feeding new sheets of film to the machine and not by the time required for carrying out the heat sealing operation itself.

In view of the fact that in the sealing device of the invention the heater elements and the cooling means therefor are combined in a single and integral structural member represented by tube 10, it is quite surprising that it is possible at all to heat up a tube to heat sealing temperatures which may be between 100–200° C. and higher, while it is being continuously cooled by a coolant fluid which may have a temperature in the order of 15°–25° C. Experiments have demonstrated, however, that it is entirely feasible to maintain such steep temperature gradient across the wall thickness of the tube. While I do not wish to advance any definite theory to explain this remarkable and unexepected phenomenon, it may be due to the fact that the thickness of the tube wall, although quite small, still permits maintaining the inner surface of the tube at a temperature which is widely different from that of the outer surface of the tube, this being facilitated by the relatively low thermal conductivity of the metals used for the tube. Furthermore, it is believed that during the sealing cycle the temperature of the walls of the heater tube is increased at such high rate that some of the coolant fluid, such as water, may vaporize and convert into steam which temporarily prevents direct contact between the rapidly moving coolant fluid within the tube and at least portions of the inner surface of the tube. During the period the tube is heated, appreciable pressure surges may develop within the tube due to heat expansion or partial vaporization of the coolant fluid. However, these pressure surges are harmlessly dissipated by the cushioning effect of the elastic conduits (for example couplings 33 and 38) interposed into the circulatory flow of coolant fluid.

Obviously, due to the powerful cooling effect of the flow of coolant fluid through the tube 10, considerably more heater current is needed to obtain heat sealing temperatures than would be necessary in the absence of such coolant flow. The intensity of the current pulse necessary for sealing can be considerably reduced by shutting off the flow of coolant fluid during the time heating current is passed through the wall of the tube. This may be accomplished by closing switch 43, thus completing the operating circuit of solenoid valve 35. This valve is normally maintained open by means of spring 39 so that, in the absence of heater current pulses, the circulatory flow of coolant fluid is maintained. Upon actuation of switching mechanism 24, both the primary winding 22 of transformer 18, as well as solenoid 40 of the valve 35 will be simultaneously energized due to the fact that they are effectively connected in parallel with each other. This will cause the solenoid valve to temporarily shut off the flow of coolant fluid for the time of the heating or sealing period. While some coolant fluid may still remain within the tube, its mass is so small that the cooling effect produced thereby is likewise quite small. Also, most, if not all, of this residual quantity of coolant fluid may be rapidly expelled by the pressure developed in the interior of the tube 10 already during the initial portion of the heating period. Thus the cooling effect will be reduced to a very low value and the heat sealing temperature will be reached much more rapidly than in the presence of an uninterrupted coolant fluid flow. After the end of the sealing period, transformer winding 22 and with it also solenoid 40 will be deenergized, solenoid valve 35 will be opened and the coolant fluid circulation is rendered fully effective, rapidly removing all traces of residual heat from tube 10 and from the sealed region of the sheets in contact therewith so that the machine is ready practically instantaneously for the next sealing cycle. While the modified heat sealing machine and method just described is quite advantageous in special instances, it is to be remembered, however, that fully satisfactory operation of the heat sealing device of the invention can be obtained without coordinating the flow of coolant fluid to that of the flow of heating current.

Considerable variations are possible in the dimensions of the heater tube 10 in accordance with the specific sealing problem contemplated. Thus, good results are obtained with tubes having a diameter between $\frac{1}{16}''$ and $\frac{1}{4}''$, the preferred diameter being in the order of $\frac{3}{32}''$, and having a wall thickness between 0.001'' and 0.010'', the preferred wall thickness being in the order of 0.005''. In general, it is desirable to use metals of relatively low thermal and electrical conductivity, such as especially the nickel-chromium and other alloys of high specific resistivity referred to in the foregoing. Metals or alloys of high thermal and electrical conductivity, such as aluminum, copper, brass, bronze, etc. are less desirable due to the very heavy currents needed for heating them to heat sealing temperatures and also due to the difficulty of maintaining a steep temperature gradient across the wall thickness thereof. Although the heater tube of the invention has been shown in the drawing in the form of a straight or linear member, it is possible to give it any desired configuration, such as curved, sinuous circular, spiral, and the like shapes, in accordance with the configuration of the desired seal.

Also, while the cross section of the heater tube has been shown in the drawing as being circular, cross sections of widely different types may be used with equal or similar results, for example oval, rectangular, corrugated, and the like, cross sections, and may provide specific advantages in certain special cases. Thus in Fig. 3 there is shown a heater tube 46 of rectangular cross section, through the inner space 47 of which a coolant fluid flow may be passed in the manner just described. Tube 46 is mounted in a groove 48 of corresponding shape formed in a metal base or bar 49 and is insulated from the base by means of an interposed layer 50 of insulation. It is also possible, however, to form the entire base or bar 49 of insulating material capable of resisting the sealing temperatures without deterioration. The effective pressure surfaces of tube 46 and bar 49 are so formed as to be flush with each other, although in many cases it is more desirable to have the sealing surface 51 of the heater tube 46 slightly higher than that of the adjacent surfaces of bar 49. As in the other embodiment of the invention, the heater tube 46 and bar 49 are arranged for cooperation with a pressure bar 14 having a layer 17 of elastic material thereon.

In operating the machines of the invention, it has been found that in some cases and at extremely high operating speeds, slight irregularities in the form of small extruded spots along the sealed region of the sheets may appear. It has been found that these slight and in most cases hardly noticeable irregularities are due to the development of steam bubbles in the coolant fluid which temporarily reduce the intimate heat exchange relation between the said fluid and small portions of the inner surface of the heater tube. This difficulty can be eliminated by using coolant fluids having a boiling point higher than the heat sealing temperature of the thermoplastic film. Suitable coolant fluids of high boiling points are, for example, glycerin, which boils at 290° C., and ethylene glycol, which boils at 197.5° C. Both glycerin and ethylene glycol are miscible with water in any desired proportion so that it is possible to provide coolant fluids of any practically desirable boiling point. Also the admixture of water advantageously reduces the relatively high viscosity of glycerin or ethylene glycol. The cost of these modified coolant fluids is no factor in the cost of operating the machines of the invention as a few gallons of coolant fluid, which are continuously recirculated, are sufficient for the operation of most heat sealing machines for long periods of time.

It will be noted that the heat sealing device and method of the invention provide numerous advantages of which the most important may be listed as follows:

1. By combining the heater or sealing element and the cooling means therefor into a single and integral structural member or unit, an extremely efficient and intimate heat exchange relation may be obtained between the two, permitting the temperature of the tubular heater element to fluctuate between heat sealing temperature and cooling or consolidating temperature at a rate which was altogether impossible heretofore.

2. The extremely rapid cooling of the tubular heater or sealing element between successive sealing cycles positively prevents sticking of the sealed films to the element and facilitates rapid removal thereof from the sealing face of the said element. As a matter of fact, in most cases the sealed region of the films will practically drop off from the heater element or tube after the completed sealing cycle.

3. The structure of the heater or sealing element of the invention combines great simplicity with great structural rigidity so that its deformation during or after sealing is prevented.

4. The sealing element of the invention may be provided in any desired linear or non-linear configuration so that not only straight seals but also curved seals of any desired form may be obtained.

5. The heater element of the invention may be readily mounted on a suitable base so that it is securely held against displacement in any direction transverse to the axis thereof without, however, interfering with its free linear expansion under the effect of sealing heat.

6. The heater element of the invention may be readily applied to existing heat sealing machines of the thermal impulse type without necessitating any expensive structural changes in the machine.

Although the present invention has been described in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. A machine for heat sealing thermoplastic sheets comprising, in combination, a sealing member and a pressure member, said sealing member comprising a layer of electrically conducting material having a first surface constituting a sealing face and a second surface separated from the said first surface by the thickness of said layer, means for producing a pulse of electrical current in the said layer of the sealing member to heat the said first surface thereof to heat sealing temperatures, means for passing a flow of coolant fluid in direct contact and in intimate heat exchange relation with the said second surface to withdraw heat from the said layer of the sealing member, and means for causing relative reciprocation of said sealing and pressure members.

2. A machine for heat sealing thermoplastic sheet material, and the like, comprising, in combination, a sealing member and a pressure member, said sealing member comprising a metal tube arranged for being intermittently heated to heat sealing temperatures by the flow of pulses of electrical current in the wall thereof and for being continuously cooled by the flow of a coolant fluid through the inner space thereof, and means for causing relative reciprocation of said sealing and pressure members.

3. A machine for heat sealing thermoplastic films comprising, in combination, a sealing member and a pressure member, said sealing member comprising a metal tube, means for intermittently applying an electrical potential between two spaced points on said tube thereby to heat the portion of the tube between said points to heat sealing temperatures, means for introducing coolant fluid into the tube at one end thereof and for discharging such fluid therefrom at the other end thereof thereby to withdraw heat from said tube, and means for displacing said sealing and pressure members towards each other to apply sealing heat and pressure upon the films interposed therebetween.

4. A machine for heat sealing thermoplastic materials comprising, in combination, a sealing member and a pressure member, said sealing member comprising a base and a metal tube insulatedly mounted on said base, a pair of terminal members mounted on respective terminal regions of said tube through which said tube may be interposed into an electrical circuit to heat it to heat sealing temperatures by the passage of electrical current pulses therethrough, intake and outlet means respectively associated with the ends of said tube to establish a flow of coolant fluid through the inner space thereof, and means for displacing said sealing and pressure members towards each other to apply sealing heat and pressure upon the layers of thermoplastic material interposed therebetween.

5. A machine for heat sealing thermoplastic materials comprising, in combination, a sealing member and a pressure member, said sealing member comprising an insulative base and an elongated tube formed of metal of high specific resistivity mounted on said base, terminal members for said tube for interposing at least a portion of the length of said tube in an electrical heating circuit, a conduit for connecting one end of said tube to a source of coolant fluid under pressure to introduce coolant fluid into the tube at said end and to discharge such fluid from the tube at the other end thereby maintaining a flow of coolant fluid through the tube, and means for displacing said sealing and pressure members towards each other to apply sealing heat and pressure upon the layers of thermoplastic material interposed therebetween.

6. A device for heat sealing thermoplastic films comprising an insulative base, a metal tube arranged for being heated by the passage of an electric current in the wall thereof and for being cooled by a coolant fluid in the inner space thereof, and mounting means for holding said tube on said base against displacement in directions transverse to its axis while permitting limited displacement thereof in the direction of its axis under the effect of heat expansion.

7. A device for heat sealing thermoplastic film comprising a base, an elongated groove in said base, and a tube of metal of relatively low electrical and heat conductivity in said groove, the respective cross sections of said groove and of said tube being so coordinated that the tube is held against transverse displacement while being capable of linear expansion, said tube having an elongated sealing surface exposed.

8. A device for heat sealing thermoplastic materials comprising a metal base having an elongated groove therein, a tube of metal of low conductivity in said groove, and a layer of insulation interposed between corresponding surfaces of said tube and said groove, said tube being secured against displacement transversely of its axis and having a longitudinal surface portion thereof exposed for contact with the material to be sealed.

9. A device for heat sealing thermoplastic materials comprising a metal bar having a pressure face with a groove therein, a layer of insulation on the inner surface of said groove, and a metal tube mounted in said groove and insulated from said bar, said tube having an exposed surface extending substantially in the plane of said pressure face of the bar and constituting a sealing face.

10. A heat sealing machine of the thermal impulse type comprising, in combination, a sealing member and a pressure member, said sealing member comprising a base and a metal tube mounted on said base, means for interposing at least part of the length of said tube into an electrical pulse generating circuit to intermittently heat it to heat sealing temperatures, a conduit for connecting one end of said tube to a source of coolant fluid, said conduit being formed of an electrical insulating material whereby said tube and said source are effectively connected for coolant fluid flow but are electrically disconnected from each other, and reciprocating means for said sealing and pressure members.

11. A heat sealing machine of the thermal impulse type comprising, in combination, a sealing member and a pressure member, said sealing member comprising a base and a metal tube mounted on said base, terminal members for said tube for interposing at least a portion of the length thereof in an electrical heating circuit, conduit means for the ends of said tube for maintaining a flow of coolant fluid through the tube, at least a portion of said conduit means being made of elastically deformable material to cushion pressure surges produced in said flow, and reciprocating means for said sealing and pressure members.

12. A machine for heat sealing thermoplastic films comprising, in combination, a sealing member and a pressure member, said sealing member comprising a metal tube, means for passing heating current through the wall of said tube for a predetermined sealing period thereby to heat the tube to heat sealing temperatures, means for maintaining a continuous flow of coolant fluid through the inner space of said tube thereby to withdraw heat therefrom, means for adjusting said coolant fluid flow, means for so adjusting the intensity of said heating current with respect to the flow of said fluid that the heating effect of said current greatly exceeds the cooling effect of said coolant fluid during said sealing period, and reciprocating means for said sealing and pressure members.

13. A machine for heat sealing thermoplastic films comprising, in combination, a sealing member and a pressure member, said sealing member comprising a metal tube, means for passing heating current through the wall of said tube for a predetermined sealing period thereby to heat the tube to heat sealing temperatures, means for maintaining a continuous flow of coolant fluid through the inner space of said tube to withdraw heat therefrom, means effective during said period for disabling said flow of coolant fluid substantially for the duration of such period, and reciprocating means for said sealing and pressure members.

NICHOLAS LANGER.

REFERENCES CITED

The following references are of record in the file of this patent:

UNITED STATES PATENTS

| Number | Name | Date |
|---|---|---|
| 808,479 | Riddle | Dec. 26, 1905 |
| 1,753,408 | Gebhard | Apr. 8, 1930 |
| 1,857,029 | Moser | May 3, 1932 |
| 1,972,942 | Meyercord | Sept. 11, 1934 |
| 2,241,312 | Luty | May 6, 1941 |
| 2,289,618 | Young | July 14, 1942 |
| 2,460,460 | Langer | Feb. 1, 1949 |
| 2,500,874 | Salfisberg | Mar. 14, 1950 |
| 2,509,439 | Langer | May 30, 1950 |